United States Patent Office 3,262,849
Patented July 26, 1966

3,262,849
SUPPOSITORY BASE COMPOSITIONS
Gustav Lietz, Dusseldorf-Holthausen, and Günter Meinhard, Eggerscheidt, Ratingen, Germany, assignors to Dehydag Deutsche Hydrierwerke G.m.b.H., Dusseldorf, Germany, a corporation of Germany
No Drawing. Filed Mar. 10, 1965, Ser. No. 438,791
Claims priority, application Germany, Apr. 24, 1959, D 30,529
9 Claims. (Cl. 167—64)

This application is a continuation-in-part of application Serial No. 23,125, filed April 19, 1960, now abandoned.

This invention relates to a base material for suppositories containing pharmaceutically active ingredients and more particularly to a base material comprising the condensation of high molecular fatty alcohols, admixed with alkali metal and alkaline earth metal soaps.

For the production of suppositories, suitable fatty or wax-like compositions have heretofore been used as base materials in which the pharmaceutically active ingredients are incorporated. These base materials melt at body temperature and give off the active ingredients to the body organism. Materials which have been used for this purpose are high molecular alkyl esters of dibasic carboxylic acids, polyethylene oxide waxes or mixtures of fatty acid glycerides and the like, one well known substance being known as cocoa butter.

It is an object of this invention to provide a base material for suppositories which has a short solidification period enabling it to harden rapidly without special cooling means.

Another object is to provide a base material for suppositories which may be readily removed from the mold after hardening without prior treatment of the mold.

A further object is to provide a suppository base from which suppositories may be obtained which have a shiny, dry surface and may be readily compounded.

Yet another object is to provide a suppository base material which has high absorptive capacity for aqueous, alcoholic, glycerin and oily liquid solutions.

Still a further object is to provide a suppository base material giving suppositories made therefrom excellent shape retention properties, good shelf-life and smooth break.

It is a further object of this invention to provide a suppository base composition having good heat transfer properties which permits rapid solidification of the suppository composition melt while producing a homogenous suppository mass.

These and other objects of our invention will become apparent as the description thereof proceeds.

We have now found that the above objects may be met and that base materials for suppositories with particularly advantageous properties are obtained by subjecting high molecular fatty alcohols to a condensation reaction according to Guerbet in a well-known manner. The condensation proceeds in accordance with the following reaction equation,

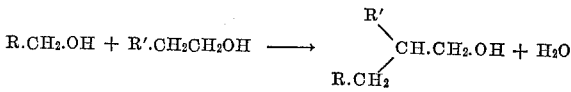

wherein R and R' represent discrete or different aliphatic radicals.

While water is split off, high molecular dimeric branched chain primary alcohols are formed thereby. The condensation is carried out in known fashion by heating the starting material to temperatures above 150° C., preferably to 200 to 250° C. or higher, in the presence of basic condensation agents, especially of alkalies, and in the presence of copper or copper compounds, as well as nickel or zinc and their compounds as catalysts, while continuously removing the water formed by the reaction. The branched chain aliphatic alcohols thus obtained are separated from the catalyst and purified; they may still contain small amounts of the monomeric alcohols.

The starting materials used for the production of the suppository base material in accordance with the invention are primarily mixtures of aliphatic alcohols having a carbon chain length of 16 to 18 carbon atoms, that is alcohols which upon condensation yield mixtures of branched chain molecular alcohols of the type indicated above with a chain length of about 32 to 36 carbon atoms. Such mixtures have a melting point of about 37° C. In addition to these alcohols, it is also possible to use alcohols having a somewhat lower molecular or higher molecular structure, in general those having a chain length of about 14 to 20 carbon atoms. In this manner the melting points of the branched chain alcohols or their mixtures may be varied within the suitable range of melting points of about 32 to 42° C. and it is thus possible to adjust the properties of the suppositories to the conditions which are required by the pharmaceutically active ingredients or the method of application.

In the production of the base materials for the suppositories it is possible to start with alcohols having the same chain length or with alcohols having a different chain length, whereby either uniform or mixed dimeric branched chain alcohols are obtained. Examples of suitable starting alcohols are myristic alcohol, cetyl alcohol, octadecyl alcohol, hydroxy octadecyl alcohol, arachyl alcohol, behenyl alcohol and the like, as well as corresponding branched chain alcohols of natural or synthetic origin.

We have found that soaps, especially aluminum soaps, zinc soaps and alkaline earth metal soaps which dissolve in the required amount very readily in the melt of the suppository base substance are surprisingly effective and at the same time pharmacologically completely acceptable additives for the intended purpose. The solidification of the suppositories, with and without medicament additives, made of branched chain, primary fatty alcohols according to Guerbet, with a content of 1 to 5%, preferably 2% of these alkali metal and alkaline earth metal soaps always leads to satisfactory, smooth suppositories having a homogeneous internal and external structure which may readily be removed from the molds, even when the molds are excessively cooled with ice water or refrigeration mixtures.

The fatty acids which are suitable for the preparation of the soaps are those aliphatic fatty acids having from 12 to 22 carbon atoms such as especially, palmitic acid, stearic acid or behenic acid. However, erucic acid and brassidic acid have also been found to be useful, as well as unsaturated acids such as oleic acid.

The suppository base materials produced in accordance with the invention have a very narrow melting point range, that is the solidification point and the melting point are very close to each other. Consequently, they have a very short solidification period and very rapidly harden, so that during the preparation of the suppositories no special cooling means are in most cases required. The suppositories may readily be removed from the mold, so that the molds need not be greased or otherwise subjected to a preparatory treatment to facilitate the removal of the suppositories. The suppositories thus obtained have a smooth, shiny surface and are absolutely dry, so that they can be readily compounded.

We have also found that the heat transfer capability of the melt is increased to such an extent by the presence of the metallic soap that no obstacle to the flow of heat toward the exterior is formed. This additive has the effect that the suppository material can be shaped into suppositories in strongly cooled molds, whereby the manufacturing process is considerably accelerated.

Particularly noteworthy is the fact that the suppositories have a considerable absorptive capacity for aqueous, alcoholic or oily liquid solutions. The absorption capacity for water, for example, is up to 50%, the absorption capacity for glycerin up to 55% and the absorption capacity for ethyl alcohol up to 30%. Despite this high absorptive capacity for liquids, the suppositories exhibit excellent shape retention properties, good shelf-life and break smoothly. It is therefore possible to incorporate into the suppository base material without difficulty, solutions of pharmaceutically active agents in water, glycerin, alcohol or oils. Of course, it is also possible to suspend or emulsify in the base materials insoluble pharmaceutically active ingredients in accordance with known methods.

In order to facilitate the distribution of known additives in suppository base material, emulsifiers, especially non-ionic WO-emulsifiers, which are compatible with the base material may be used. Suitable emulsifiers for this purpose are polyethoxylation products of fatty or wax alcohols, fatty acids or other substances containing lipophilic radicals and exchangeable hydrogen atoms, esters of fatty acids formed with polyalcohols such as pentaerythrite, sorbitol, mannitol and all types of sugars or corresponding ethers of fatty or wax alcohols formed with these polyalcohols. Furthermore, fatty alcohols, wax alcohols, especially wool grease alcohols and the like, are suitable to a certain extent for use as emulsifying additives. The emulsifiers are added in customary fashion to the molten suppository base material in amounts between 0.5 and 10%, preferably from 1 to 3%, depending upon the type of active ingredient employed. The pharmaceutically-active ingredients are incorporated into the base material in accordance with known methods. The base materials according to the invention are compatible with all customary active ingredients and absorb the active ingredients in all quantities required by the particular indications.

Because of the favorable melting period, which in vitro amounts to about 4 to 6 minutes at 37° C., depending upon the size of the suppository, and which is substantially shorter under the conditions existing in the living body, the pharmaceutically-active ingredients contained in the suppositories exert their effects very rapidly.

Active pharmaceutical ingredients which may be incorporated into the base suppository material of the invention are any of those known to be administerable by means of a suppository. This includes any pharmaceutical to be taken internally, providing of course that it is not intended to take effect in the gastric organs.

Some of these pharmaceutical ingredients are for example: ichthammol, cod liver oil, aminophenazone, codeine phosphate, phenacetin, hamamelis extract, bismuth gallate, zinc oxide, eucalyptus oil, cajuput oil, caffein, oxyethyltheophyllin papaverine, Eumydrin (atropine methylnitrate), phenobarbital, aminophylline, pentobarbital sodium, benzocaine, hydrocortisone, sodium bicarbonate, potassium bitartrate, Bellafolin, ergotamine tartrate, caffeine alkaloid, trypsin, peru balsam, pyrilamine maleate, chloral hydrate, theophyllin, acetylsalicylic acid, secobarbital sodium, powdered opium, extract belladonna, dioctyl sodium sulfosuccinate, mercaptomerin, ephedrine sulfate, boric acid, bismuth oxyiodide, bismuth subcarbonate, ephedrine, hyoscyamine, pentobarbital, stilbesterol, diiodohydroxyquinoline, sulfadiazine, sorbic acid, Hyamine, diethylstilbesterol, diperodon·HCl, phenylmercuric acetate, methylbenzethonium chloride, methylparaben, Nembutal Sodium, Pyribenzamine (Tripelennamine), dibucaine hydrochloride, acetone sodium bisulfite.

As previously indicated, the active pharmaceutical ingredients may be incorporated in any well known manner in the suppository base, for example, in aqueous, oily, glycerin or alcoholic solutions or suspensions. The suppository base has been found to be completely compatible physiologically and to be effective in releasing the pharmaceutical ingredient incorporated therein for therapeutic purposes.

The following specific examples are given to illustrate our invention and to enable persons skilled in the art to better understand and practice the invention and are not intended to be limitative.

EXAMPLE I 2 parts magnesium stearate are dissolved at a temperature of 110 to 115° C. in 98 parts of a melt consisting of a dimerized branched chain, primary fatty alcohol with 28 to 36 carbon atoms, produced according to Guerbet and accompanied by splitting off of water, and the resulting melt was worked up into suppositories in the customary fashion.

EXAMPLE II 98 parts by weight of a melt produced at 110 to 115° C. by condensation according to Guerbet of branched chain primary fatty alcohols with 28 to 36 carbon atoms are intimately admixed with 2 parts by weight of zinc behenate, and the mixture was maintained at a temperature above 100° C. until the behenate dissolved. The solution was allowed to cool and was molded into suppositories by pouring the mixture at about 40 to 45° C. in customary fashion into molds which had been previously cooled in any desired manner.

In the same manner as in Examples I and II, additional suppository base compositions were produced as follows:

EXAMPLE III

| | Percent |
|---|---|
| Magnesium stearate | 2 |
| Emulsifying agent (polyethylene derivative of a sorbitane bees wax ester) | 2 |
| Guerbet alcohol prepared by dimerization of a $C_{16}$–$C_{18}$ alcohol mixture | 96 |

The melting range of the mixture was 35 to 37° C.

EXAMPLE IV

| | Percent |
|---|---|
| Magnesium stearate | 2 |
| Guerbet alcohol from $C_{16}$–$C_{18}$ alcohol mixture | 98 |

The melting range of the mixture was 33 to 35° C.

EXAMPLE V

| | Percent |
|---|---|
| Aluminum stearate | 5 |
| Guerbet alcohol from $C_{18}$ alcohol | 95 |

The melting range of the mixture was 35 to 40° C.

EXAMPLE VI

| | Percent |
|---|---|
| Zinc behenate | 3 |
| Guerbet alcohol from $C_{16}$ alcohol | 97 |

The melting range of the mixture was 30 to 32° C.

EXAMPLE VII

| | Percent |
|---|---|
| Zinc oleate | 2 |
| Wool fatty alcohol (as emulsifier) | 2 |
| Guerbet alcohol from $C_{14}$ alcohol | 5 |
| Guerbet alcohol from $C_{16}$ alcohol | 45.5 |
| Guerbet alcohol from $C_{18}$ alcohol | 45.5 |

The melting range of the mixture was 32 to 34° C.

The following examples show that the suppository base compositions are capable of absorbing relatively large quantities of water, alcohol, oil or glycerin. In practice, these fluid substances serve as solvents for pharmaceuticals.

EXAMPLE VIII

| | Percent |
|---|---|
| Magnesium stearate | 1.5 |
| Emulsifier ($C_{16}$–$C_{18}$ alcohol mixture) | 3.5 |
| Ethyl alcohol 70% | 25 |
| Guerbet alcohol from $C_{16}$–$C_{18}$ alcohol mixture | 70 |

EXAMPLE IX

| | Percent |
|---|---|
| Magnesium stearate | 1 |
| Emulsifier ($C_{16}$–$C_{18}$ alcohol mixture) | 1 |
| Glycerin 28° Bé. | 50 |
| Guerbet alcohol from $C_{16}$–$C_{18}$ alcohol mixture | 48 |

EXAMPLE X

| | Percent |
|---|---|
| Zinc behenate | 1 |
| Emulsifier ($C_{16}$–$C_{18}$ alcohol mixture) | 1 |
| Water | 38 |
| Guerbet alcohol from $C_{16}$ alcohol | 36 |
| Guerbet alcohol from $C_{18}$ alcohol | 24 |

EXAMPLE XI

| | Percent |
|---|---|
| Aluminum stearate | 5 |
| Olive oil | 20 |
| Guerbet alcohol from $C_{18}$ alcohol | 75 |

EXAMPLE XII

In order to compare the absorptive capability of the inventive suppository base material, with a conventional suppository material, the compositions shown in Examples VIII, IX, X and XI were prepared using cocoa butter in place of the Guerbet alcohol. All other ingredients and the quantities were identical. In no case was it possible to obtain a suitable suppository since the large quantity of liquid substances prevented solidification of the cocoa butter suppositories or, due to the fact that separation resulted between the liquid and cocoa butter. Suppository base substances, which allow the working in of 40% of water, 25% of ethyl alcohol, 20% or more of oily substances or 50% of glycerin, with the addition of pharmaceutical, effective substances as desired, and therewith present satisfactory suppositories, does represent an extraordinary, technical progress not only compared with the cocoa butter but also compared with other known suppository substance, for example, triglycerides. This type of formulas could not be attained with the previous suppository substances.

The following examples show therapeutic suppositories compounded with various pharmaceutically effective ingredients.

The preparation of the suppositories is performed in the customary manner by melting together the ingredients and pouring them into forms, which if necessary are cooled. As mentioned in the foregoing description, this cooling is superfluous in most cases.

EXAMPLE XIII

| | Percent |
|---|---|
| Magnesium stearate | 2 |
| Wool fatty alcohol | 2 |
| Guerbet alcohol from $C_{16}$–$C_{18}$ alcohol mixture | 76 |
| Ichthammol | 20 |

Melting point of the suppository 34.5° C.

EXAMPLE XIV

| | Percent |
|---|---|
| Magnesium stearate | 2 |
| Wool fatty alcohol | 2 |
| Guerbet alcohol from $C_{16}$–$C_{18}$ alcohol mixture | 76 |
| Cod liver oil | 20 |

Melting point of the suppository 35° C.

EXAMPLE XV

| | Percent |
|---|---|
| Magnesium stearate | 1.5 |
| Wool fatty alcohol | 1.5 |
| Guerbet alcohol from $C_{16}$–$C_{18}$ alcohol mixture | 72 |
| Aminophenazone (dimethylamino - phenyldimethylpyrazolon) | 25 |

Melting point of the suppository 33.5° C.

EXAMPLE XVI

| | Percent |
|---|---|
| Magnesium stearate | 1.5 |
| Wool fatty alcohol | 1.5 |
| Guerbet alcohol from $C_{16}$–$C_{18}$ alcohol mixture | 71 |
| Codeinphosphate | 1 |
| Phenacetin (para-acetphenetidin) | 12.5 |
| Aminophenazon | 12.5 |

Melting point of the suppository 35° C.

EXAMPLE XVII

| | Percent |
|---|---|
| Magnesium stearate | 2 |
| Wool fatty alcohol | 2 |
| Guerbet alcohol from $C_{16}$–$C_{18}$ alcohol mixture | 74 |
| Hamamelis extract, distilled (White Hazel extract) | 10 |
| Bismuth gallate, basic | 5 |
| Zinc oxide | 5 |
| Peruvian balsam oil | 2 |

Melting point of the suppository 35° C.

EXAMPLE XVIII

| | Percent |
|---|---|
| Magnesium stearate | 2 |
| Wool fatty alcohol | 2 |
| Guerbet alcohol from $C_{16}$–$C_{18}$ alcohol mixture | 74 |
| Emulsifier ($C_{16}$–$C_{18}$ alcohol mixture) | 2 |
| Eucalyptus oil | 10 |
| Cajuput oil (Gomenol, cajuput oil) | 10 |

Melting point of the suppository 36.5° C.

The following tests were made and clinical data and expert opinions were obtained to establish the physiological compatibility and effectiveness for the intended purpose of the suppository base of the invention.

Tests

The tests involved a pharmacological investigation of the suppository mass of this application designated as "DHW-Suppository Mass III" having an exact composition as follows:

96% of a Guerbet alcohol mixture obtained by subjecting a fatty alcohol mixture having chain lengths of $C_{16}$ to $C_{18}$ to a Guerbet reaction, 2% of an emulsifier with ethoxylated sorbitol derivatives, 2% of magnesium stearate.

The investigation was conducted to determine the safety and effectiveness of the above suppository base mass.

In the following investigations it was separately determined whether the preparation contains toxic substances and whether it produces local irritation effects.

SERIES I (1) *Investigation of general effects*

(A) TESTS ON RATS

Each of 5 rats received 5 ml./kg. of the suppository mass, which had previously been melted by heating, through an esophageal sound. All of the rats survived this administration for 6 weeks without any particular symptoms. The body weight increased slightly or remained constant.

Each of 5 rats received 5 ml./kg. of the suppository mass through an esophageal sound three times a week, for a total of 12 times. All of the rats survived this feeding without disturbance of the general condition. The body weight of all animals increased.

(B) TEST ON RABBITS

A rabbit received three times weekly 5 ml./kg. of the suppository mass by esophageal sound, for a total of 12 times. The blood, urine and body weight were continuously checked. The body weight showed uncharacteristic variations. No pathological changes could be observed in the urine. The erythrocytes and the hemoglobin showed an insignificant increase. The leucocytes temporarily increased slightly by a value which still lies within the range of normal variation. The differential blood picture was relatively constant.

A second rabbit received three times weekly 5 ml./kg. of suppository mass through an esophageal sound, for a total of eight times. The body weight decreased somewhat during the first week, but recovered again during the second week. Erythrocytes and hemoglobin remained practically constant, as did the differential blood picture. The leucocytes again showed a distinct increase which, however, cannot be regarded as abnormal.

(C) TESTS ON DOGS

One dog weighing 4.7 kg. received daily (except Sunday) 10 gm. of the suppository mass per os, for a total of 8 times. At that time the test was discontinued because the dog became ill with distemper. However, up to that point the dog assimilated the suppository mass without trouble.

Another dog, weighing 4.2 kg. also received daily (except Sunday) 10 gm. of the suppository mass per os, for a total of 13 times. His body weight at the end of the test was 4.32 kg. The overall condition of the animal was good during the entire time of administration.

(2) *Test for local irritation effects*

(A) TESTS ON RATS 6 rats, each weighing from 150 to 190 gm. received 0.5 ml./kg. of the suppository mass by injection into the rectum through a rubber catheter. The rectal opening was then closed off with adhesive tape from the outside. Two rats each were sacrificed after 3, 6 and 20 hours, and the rectum of each was examined.

As controls, three rats weighing 180 to 250 gm. were used, to which liquid paraffin had been administered rectally in the same amount and manner.

3 hours after administration of the suppository mass, one rat showed minor, patchy areas of reddening on the mucous membrane of the colon near the spleen flexure; the other rat showed a minor, spotty subserous hemorrhage 3 cm. above the anal opening in the colon. In addition, a fecal congestion existed. The observed phenomena must be considered as being mechanically predicated and not as being signs of an irritating effect of the suppository mass on the mucous membrane.

6 hours after administration, one rat showed a small, patchy reddening immediately above the ampule, but otherwise the mucous membrane was pale. The other rat showed no changes of the mucous membrane. Similarly, no abnormal findings were reported in the rats which were sacrificed after 20 hours.

The control tests with paraffin exhibited no changes on the mucous membrane.

The above-mentioned fecal congestion was observed in all rats. Residual amounts of the suppository mass were usually not detectable.

(B) TESTS ON DOGS

One dog, weighing 4.5 kg. received daily (except Sunday), for a total of 9 times, one suppository rectally. Inspection of area of the anus showed no sign of local irritation effects. The overall condition of the dog was good. The weight remained constant. After conclusion of the tests the dog became ill with distemper.

(C) TESTS ON HUMANS

One suppository was rectally administered in the morning and in the evening daily for a total of four weeks to one test subject. The treatment was tolerated without any subjective or objective disturbance.

*Summary.*—These tests show that "DHW-Suppository Mass III," even in high doses and upon repeated administration, can be regarded as being practically free from local and general toxic effects. There were no objections seen against employment of this suppository mass for rectal suppositories.

SERIES II

(1) *Test of general effect*

(A) TESTS ON RATS 5 additional rats were given 5 ml./kg. of the suppository mass through an esophageal sound. All of the animals survived the administration without adverse symptoms. The period of observation was 18 days. In all animals the body weight remained constant or even increased more or less.

10 rats were given 10 ml./kg. per os through an esophageal sound. The animals on the following day showed a somewhat shaggy fur, but otherwise survived an observation period of 15 and 18 days, respectively (5 animals each), without discernible symptoms. The body weight of all animals distinctly increased, with the exception of one animal whose weight remained constant.

(B) TESTS ON RABBITS 3 rabbits received 10 ml./kg. per os through an esophageal sound. The animals exhibited no abnormal behavior. Over an observation period of 11 days, the body weight of the animals remained practically constant. No pathological changes were observed in the urine. Erythrocytes and hemoglobin remained unchanged. Only the leucocytes showed certain variations, but these fell entirely within the normal range.

(C) TESTS ON DOGS 1 dog received every other day ten times 2 ml./kg. per os. Nothing unusual was observed on the animal.

(D) TESTS ON MICE 10 mice received 2 ml./kg. per os. None of the animals died.

10 mice received 5 ml./kg. per os. One animal died after 48 hours.

10 mice received 10 ml./kg. per os. One animal died after 48 hours.

(E) TESTS ON GUINEA PIGS 10 guinea pigs received 5 ml./kg. per os. One animal died after four days (Table II).

10 guinea pigs received 10 ml./kg. per os. Two animals died, one after four days, the other after ten days. The remainder exhibited no abnormal behavior.

(2) *Tests for local irritation*

TESTS ON HUMANS

Three test subjects were daily given a suppository, morning and evening, by rectum—for a total of 6 weeks. No subjective complaints or objective symptoms were observed in this case either. It was merely noted that a slight laxative effect was present, which was felt in different intensities by the individual test subjects. However, they became accustomed to this effect, so that it was felt distinctly only during the early period of observation. It may be mentioned that this laxative effect was also observed by the human test subject mentioned in the Series I tests above.

*Summary.*—The tests in this series represent, in a broad basis, a confirmation of the findings set forth in Series I. They again confirm that the preparation is substantially nontoxic and, when used as suppository, is free from damaging irritation effects.

SERIES III

It was to be determined on human patients whether upon use of the indicated substance as a base mass for suppositories.

(1) General or local disturbances to the health, and (2) A change in the therapeutic activity of added drugs would occur.

(1) *General and local compatibility*

(A) GENERAL COMPATIBILITY 22 patients received daily for a period of up to 38 days, on the average 14.5 days, from 1 to 3 suppositories made of Suppository Mass III (S III) by rectum. A total of 430 suppositories were rectally administered. During the period of observation, no toxic or allergic side effects were observed. Only in one case of chronic bronchitis did the patient indicate a decreased cough stimulation for ½ to 1 hour after administration of the suppository, which allegedly did not occur again with suppositories made of a different base substance. The control examinations of blood picture, blood corpuscle decrease rate, urine for albumin, urobilinogen and sugar and urine sediment performed 2 to 4 weeks after daily medication with the suppository mass showed no substantial changes in the values in comparison to the values obtained in preliminary examinations. In three cases (control Nos. 15, 16 and 19) the liver function was also tested with the aid of bromthalein, and in one case (control No. 8) the kidney function was tested with the aid of the phenol red test. In none of the test subjects could any discernible influence on the liver or kidney function due to any possible resorbed supporting mass be observed. Even in one patient suffering from cirrhosis of the liver (Control No. 19), with slightly elevated bromthalein dye value, no worsening of the condition occurred after daily administration of a "blank" suppository for a period of 4 weeks.

(B) LOCAL COMPATIBILITY

No patient reported, either spontaneously or upon inquiry, any local discomfort such as burning in the colon, cramps, excretion of mucous or blood from the colon, or increased urge for defecation. The rectoscopy performed on 5 patients (Control Nos. 8, 12, 14, 16 and 22) at the end of the test period showed no substantial inflammatory changes of the rectal mucous membrane, even after daily administration of a suppository over a period of 38 days (Control No. 8) or of two suppositories over a period of 22 days (Control No. 21).

(2) *Does a change occur in the effect of the drug added to the suppository mass?*

Aside from 10 patients, who received S III without addition of a drug (so-called "blank" suppositories), there were administered "Dolviran"-S III-suppositories to 6 patients, "Perphyllon"-S III-suppositories to 2 patients (see Table I), which were prepared by the pharmacy of the Academy of Medicine. According to the statement of the chief pharmacist, no difference existed between the commercial compositions (drug composition see Red List 1957, pages 221 and 550) and the "Dolviran"-D III-suppositories and "Perphyllon"-S III-suppositories, except for the base substance.

For determination of a possible difference in activity, there were administered alternately morning and evening the above indicated self-prepared S III-suppositories containing the drugs and the corresponding commercial products prepared by Bayer and Homburg, respectively. In a simple blind test no conclusive difference in the effect was determined.

6 patients were each given rectally one suppository composed of S III and one of a customary suppository mass (fatty acid triglycerides) on two successive evenings. The feces spontaneously expelled the following morning showed no visible residues of either type of suppository.

*Summary.*—The tests on 22 human patients showed the absence of general and local detrimental effects on the health of the patients upon use of suppositories made from DHW-Suppository Mass III over the indicated test period. No reduction in the activity of the drugs which were added to the suppositories was discerned. On the basis of all tests, no objection was seen to the use of Suppository Mass III in humans.

TABLE I

| Ser. No. | Control No. | Period of use in days | Suppositories per day | Total No. of suppositories | Type of suppository | Remarks |
|---|---|---|---|---|---|---|
| 1 | 1 | 1 | 1 | 1 | Blank | No symptoms. |
| 2 | 2 | 3 | 1 | 3 | do | Cough stimulation. |
| 3 | 3 | 3 | 1 | 3 | do | No symptoms. |
| 4 | 4 | 3 | 1 | 3 | do | Do. |
| 5 | 6 | 8 | 1 | 8 | do | Do. |
| 6 | 10 | 8 | 1 | 8 | Analgesic | Do. |
| 7 | 7 | 9 | 1 | 9 | Perphyllon | Do. |
| 8 | 5 | 10 | 1 | 10 | Blank | Do. |
| 9 | 13 | 11 | 1 | 11 | Analgesic | Do. |
| 10 | 22 | 12 | 3 | 36 | Perphyllon | Do. |
| 11 | 12 | 12 | 1 | 12 | Analgesic | Do. |
| 12 | 18 | 13 | 2 | 26 | Hemorrhoidal | Do. |
| 13 | 17 | 14 | 2 | 28 | do | Do. |
| 14 | 14 | 14 | 2 | 28 | Analgesic | Do. |
| 15 | 11 | 14 | 1 | 14 | do | Do. |
| 16 | 20 | 21 | 2 | 42 | Perphyllon | Do. |
| 17 | 15 | 22 | 1 | 22 | Analgesic | Do. |
| 18 | 21 | 22 | 2 | 44 | Perphyllon | Do. |
| 19 | 16 | 26 | 1 | 26 | Blank | Do. |
| 20 | 9 | 26 | 1 | 26 | do | Do. |
| 21 | 19 | 32 | 1 | 32 | do | Do. |
| 22 | 8 | 38 | 1 | 38 | do | Do. |

Period of use and daily administered amount of suppositories prepared from DHW-Suppository Mass III.

TABLE II

| Ser. No. | Control No. | Laboratory Tests | Weeks 0 | 1 | 2 | 3 | 4 |
|---|---|---|---|---|---|---|---|
| 1 | 12 | Blood: | | | | | |
| | | Hemoglobin | 75% | | 75% (after 10 days). | | |
| | | Erythrocytes | 3.95 million | | 3.90 million. | | |
| | | Leucocytes | 8,300 | | 4,600. | | |
| | | Stab | 1 | | 1. | | |
| | | Segmented cells | 70 | | 65. | | |
| | | Eosinophils | 2 | | 1. | | |
| | | Lymphocytes | 23 | | 31. | | |
| | | Monocytes | 4 | | 2. | | |
| | | Blood sedimentation rate | 9/20 mm. by Westergren method | | 15/30 mm. by Westergren method. | | |
| | | Urine: | | | | | |
| | | Albumin | Negative | | Negative. | | |
| | | Urobilinogen | −/+ | | −/+. | | |
| | | Sugar | Negative | | Negative. | | |
| | | Sediment | No abnormality | | No abnormality. | | |
| 2 | 15 | Blood: | | | | | |
| | | Hemoglobin | 97% | | 100%. | | |
| | | Erythrocytes | 4.73 million | | 4.85 million. | | |
| | | Leucocytes | 6,400 | | 5,800. | | |
| | | Stab | 3 | | 2. | | |
| | | Segmented cells | 59 | | 65. | | |
| | | Lymphocytes | 31 | | 32. | | |
| | | Eosinophils | 2 | | 0. | | |
| | | Monocytes | 5 | | 1. | | |
| | | Blood sedimentation rate | 3/8 mm. by Westergren method | | 3/8 mm. by Westergren method. | | |
| | | Bromthalein-Test | 3% | | 4%. | | |
| | | Urine: | | | | | |
| | | Albumin | Negative | | Negative. | | |
| | | Urobilinogen | −/+ | | −/+. | | |
| | | Sugar | Negative | | Negative. | | |
| | | Sediment | No abnormality, except for a few Leucocytes | | No abnormality. | | |
| 3 | 16 | Blood: | | | | | |
| | | Hemoglobin | 75% | | 80%. | | |
| | | Erythrocytes | 3.75 million | | 4.10 million. | | |
| | | Leucocytes | 6,200 | | 5,400. | | |
| | | Blood sedimentation rate | 16/35 mm. by Westergren method | | 12/26 mm. by Westergren method. | | |
| | | Total Bilirubin | 1.0 mg | | 0.3 mg. | | |
| | | Bromthalein-Test | 4% | | 4%. | | |
| | | Urine: | | | | | |
| | | Albumin | Negative | | Negative | | |
| | | Urobilinogen | Trace/+ | | −/+ | | |
| | | Sugar | Negative | | Negative | | |
| | | Sediment | No abnormality | | No abnormality | | |
| 4 | 19 | Blood: | | | | | |
| | | Hemoglobin | 90% | | | | 86%. |
| | | Erythrocytes | 4.35 million | | | | 4.25 million. |
| | | Leucocytes | 3,800 | | | | 4,400. |
| | | Blood sedimentation rate | 3/7 mm. by Westergren method | | | | 2/5 mm. by Westergren method. |
| | | Bromthalein-Test | 7% | | | | 8%. |
| | | Urine: | | | | | |
| | | Albumin | Negative | | Negative | | Negative. |
| | | Urobilinogen | −/+ | | −/− | | −/+. |
| | | Sugar | Negative | | Negative | | Negative. |
| | | Sediment | No abnormality | | No abnormality | | No abnormality. |
| 5 | 20 | Blood: | | | | | |
| | | Hemoglobin | 84% | | 90% | | |
| | | Erythrocytes | − | | − | | |
| | | Leucocytes | 6,500 | 7,400 | 6,500 | | |
| | | Urine: | | | | | |
| | | Albumin | Negative | | Negative | | |
| | | Urobilinogen | −/+ | | −/+ | | |
| | | Sugar | Negative | | Negative | | |
| | | Sediment | A few Leucocytes | | A few Leucocytes | | |
| 6 | 8 | Urine: | | | | | |
| | | Albumin | Negative | | | | Negative. |
| | | Urobilinogen | −/+ | | | | −/+. |
| | | Sugar | Negative | | | | Negative. |
| | | Sediment | No abnormality | | | | No abnormality. |
| | | Phenolrot | 33% | | | | 37%. |
| | | Maximum spec. weight | 1,027 | | | | 1,028. |

Control of blood picture, liver and kidney function after repeated administration of suppositories prepared from DHW-Suppository Mass III.

CONCLUSIONS

The tests show that the Suppository Mass III, is completely safe and effective for the intended use since no toxic-degenerative effects or any other undesirable side effects were noted.

The foregoing examples clearly demonstrate that the inventive suppository mass has desirable and distinctive properties.

While we have set forth certain specific examples and preferred modes of practice of our invention, it will be understood that the invention is not limited thereto, and that various changes and modifications may be made in our invention without departing from the spirit of the disclosure or the scope of the appended claims.

We claim:

1. A suppository base composition having good mold release properties and a solidification point range of from 32 to 42° C. consisting essentially of from 90 to 99% of an alcohol having a formula

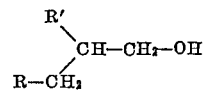

wherein R represents an alkyl radical having from 13 to 19 carbon atoms and R′ represents an alkyl radical having from 12 to 18 carbon atoms, from 1 to 5% based on the suppository mass, of a soap selected from the group consisting of aluminum soaps, zinc soaps and alkaline earth metal soaps, said soaps being formed from aliphatic acids having from 12 to 22 carbon atoms, and from 0 to 10%, based on the suppository mass, of an emulsifier.

2. The composition of claim 1 wherein the amount of said soap is 2%.

3. The composition of claim 1 wherein the amount of said emulsifier is from 1 to 3%.

4. The composition of claim 1 wherein the soap is magnesium stearate.

5. The composition of claim 1 wherein the soap is aluminum stearate.

6. The composition of claim 1 wherein the soap is zinc behenate.

7. The composition of claim 1 wherein the soap is zinc oleate.

8. A suppository base composition having good mold release properties and a solidification point range of from 32 to 42° C., consisting essentially of from 95 to 97% of an alcohol having a formula

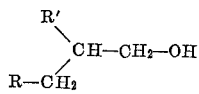

wherein R represents an alkyl radical having from 12 to 19 carbon atoms and R' represents an alkyl radical having from 12 to 18 carbon atoms, 2%, based on the suppository mass, of a soap selected from the group consisting of aluminum soaps, zinc soaps and alkaline earth metal soaps, said soaps being formed from aliphatic acids having from 12 to 22 carbon atoms, and from 1 to 3%, based on the suppository mass, of an emulsifier.

9. A suppository base composition having good mold release properties and a solidification point range of from 32 to 42° C. consisting essentially of from 90 to 99% of an alcohol having a formula

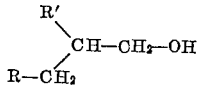

wherein R represents an alkyl radical having from 15 to 17 carbon atoms and R' represents an alkyl radical having from 14 to 16 carbon atoms, from 1 to 5%, based on the suppository mass, of a soap selected from the group consisting of aluminum soaps, zinc soaps and alkaline earth metal soaps, said soaps being formed from aliphatic acids having from 12 to 22 carbon atoms, and from 0 to 10%, based on the suppository mass, of an emulsifier.

References Cited by the Examiner
UNITED STATES PATENTS
2,898,269    8/1959    Felletschin _____ 167—90

FRANK CACCIAPAGLIA, Jr., *Primary Examiner.*